United States Patent
Su et al.

(10) Patent No.: US 8,811,911 B2
(45) Date of Patent: Aug. 19, 2014

(54) RADIO-FREQUENCY PROCESSING DEVICE AND METHOD AND RELATED WIRELESS COMMUNICATION DEVICE

(75) Inventors: Chih-Chin Su, Taoyuan County (TW); Chung-Chi Lai, Taoyuan County (TW); Chien-Ting Ho, Taoyuan County (TW); Wan-Ming Chen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 405 days.

(21) Appl. No.: 13/172,801

(22) Filed: Jun. 29, 2011

(65) Prior Publication Data
US 2012/0003947 A1  Jan. 5, 2012

Related U.S. Application Data

(60) Provisional application No. 61/360,929, filed on Jul. 2, 2010.

(51) Int. Cl.
*H04B 17/00* (2006.01)

(52) U.S. Cl.
USPC ............. 455/67.11; 455/191.2; 455/188.1; 455/150.1; 455/230; 455/572; 455/86; 455/121; 455/77; 455/129; 455/193.1; 343/860; 343/787; 343/853; 343/745; 333/32; 333/17.3

(58) Field of Classification Search
USPC ........... 455/191.2, 188.1, 191.1, 150.1, 230, 455/572, 86, 12.1, 76, 260, 245.1, 67.11, 455/77, 121, 129, 193.1; 343/860, 787, 343/853, 745; 333/32, 17.3
See application file for complete search history.

(56) References Cited

U.S. PATENT DOCUMENTS

| | | | |
|---|---|---|---|
| 8,190,109 B2 * | 5/2012 | Ali et al. ................. | 455/123 |
| 2002/0101907 A1 | 8/2002 | Dent | |
| 2002/0193088 A1 * | 12/2002 | Jung ...................... | 455/191.2 |
| 2005/0136847 A1 * | 6/2005 | Matsui et al. ............. | 455/78 |
| 2005/0225397 A1 | 10/2005 | Bhatia | |
| 2006/0160501 A1 | 7/2006 | Mendolia | |
| 2006/0261968 A1 * | 11/2006 | Shirakawa .............. | 340/671 |
| 2007/0197180 A1 * | 8/2007 | McKinzie et al. ....... | 455/248.1 |
| 2007/0236296 A1 | 10/2007 | Lee | |
| 2007/0281651 A1 * | 12/2007 | Oosawa et al. ........... | 455/245.1 |

(Continued)

FOREIGN PATENT DOCUMENTS

| | | |
|---|---|---|
| CN | 1208261 A | 2/1999 |
| CN | 1681200 A | 10/2005 |

(Continued)

OTHER PUBLICATIONS

European patent application No. 11172192.4, European Search Report mailing date: Oct. 7, 2011.

(Continued)

*Primary Examiner* — Ganiyu A Hanidu
(74) *Attorney, Agent, or Firm* — Winston Hsu; Scott Margo (57) ABSTRACT

A radio-frequency (RF) processing device, for a wireless communication device, is disclosed. The RF processing device comprises an antenna, an RF-signal processing module, a controller, for generating a control signal according to a band switching signal, and a matching adjustment module for adjusting an impedance between the antenna and the RF-signal processing module according to the control signal.

13 Claims, 7 Drawing Sheets

(56) References Cited

U.S. PATENT DOCUMENTS

| | | | |
|---|---|---|---|
| 2008/0094149 A1* | 4/2008 | Brobston | 333/17.3 |
| 2008/0218291 A1* | 9/2008 | Zhu et al. | 333/32 |
| 2008/0261544 A1 | 10/2008 | Blin | |
| 2009/0121963 A1 | 5/2009 | Greene | |
| 2009/0243397 A1* | 10/2009 | Cook et al. | 307/104 |
| 2010/0144292 A1* | 6/2010 | Kim | 455/129 |
| 2010/0248650 A1* | 9/2010 | Rofougaran et al. | 455/77 |
| 2011/0070848 A1* | 3/2011 | Ramachandra Reddy | 455/127.2 |
| 2011/0086600 A1* | 4/2011 | Muhammad | 455/120 |

FOREIGN PATENT DOCUMENTS

| | | |
|---|---|---|
| CN | 101036302 A | 9/2007 |
| CN | 101312354 A | 11/2008 |
| CN | 101641869 A | 2/2010 |
| WO | 2006038167 A1 | 4/2006 |
| WO | 2008093154 A1 | 8/2008 |
| WO | 2009064968 A1 | 5/2009 |

OTHER PUBLICATIONS

Office action mailed on Aug. 14, 2013 for the China application No. 201110184831.5, filing date Jul. 1, 2011, p. 1-10.

Office action mailed on Mar. 27, 2014 for the China application No. 201110184831.5, filed Jul. 1, 2011.

* cited by examiner

RADIO-FREQUENCY PROCESSING DEVICE AND METHOD AND RELATED WIRELESS COMMUNICATION DEVICE

CROSS REFERENCE TO RELATED APPLICATIONS

This application claims the benefit of U.S. Provisional Application No. 61/360,929, filed on Jul. 2, 2010 and entitled "Continuously tunable antenna matching circuit for a compact multi-band mobile antenna", the contents of which are incorporated herein in their entirety.

BACKGROUND OF THE INVENTION

1. Field of the Invention

The present disclosure relates to a radio-frequency processing device and method and related wireless communication device, and more particularly, to a radio-frequency processing device and method and related wireless communication device capable of obtaining different matching states, varying VSWR and extending operating bandwidth to lower bands without extending the dimension of an antenna.

2. Description of the Prior Art

Mobile devices utilize antennas to emit and receive radio waves, so as to access a mobile system. Therefore, to facilitate a user's access to the mobile system, an ideal antenna should maximize its bandwidth within a permitted range, while minimizing physical dimensions to accommodate the trend for smaller-sized electronic products. However, with the advance of wireless communication technology, more and more bands are used for the mobile system, such as 850 band (824-894 MHz), 900 band (880-960 MHz), 1800 Band (1710-1880 MHz), 1900 band (1850-1990 MHz) and 2100 band (1920-2170 MHz). Recently, the mobile system is going to evolve from 3G to 4G, i.e. Long-Term Evolution (LTE) system, and extra bands below the 850 band, i.e. BC13 (764 MHz to 787 MHz) and BC17 (704 MHz to 746 MHz), are added. In such a situation, an antenna of a 4G mobile device covers more frequency ranges and has larger dimension due to the extra bands below the 850 band. Besides, MIMO (Multiple Input Multiple Output) technology has been involved to improve data throughput, which means that the mobile device needs 2 or more antennas for 4G, and thus, a much fewer volumes are available for these antennas.

Therefore, how to efficiently increase operating bands for a mobile antenna while meeting the small-sized requirement has become a challenge for this industry.

SUMMARY OF THE INVENTION

The disclosure therefore provides a radio-frequency processing device and method and related wireless communication device.

A radio-frequency (RF) processing device, for a wireless communication device, is disclosed. The RF processing device comprises an antenna, an RF-signal processing module, a controller, for generating a control signal according to a band switching signal, and a matching adjustment module for adjusting an impedance between the antenna and the RF-signal processing module according to the control signal.

A radio-frequency (RF) processing method, for a wireless communication device, is disclosed. The RF processing method comprises adjusting an impedance between an antenna and an RF-signal processing module of the wireless communication device according to a band switching signal.

A wireless communication device is disclosed, and comprises a baseband module, and a radio-frequency (RF) processing device. The RF processing device comprises an antenna, an RF-signal processing module, a controller, for generating a control signal according to a band switching signal provided by the baseband module, and a matching adjustment module for adjusting an impedance between the antenna and the RF-signal processing module according to the control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
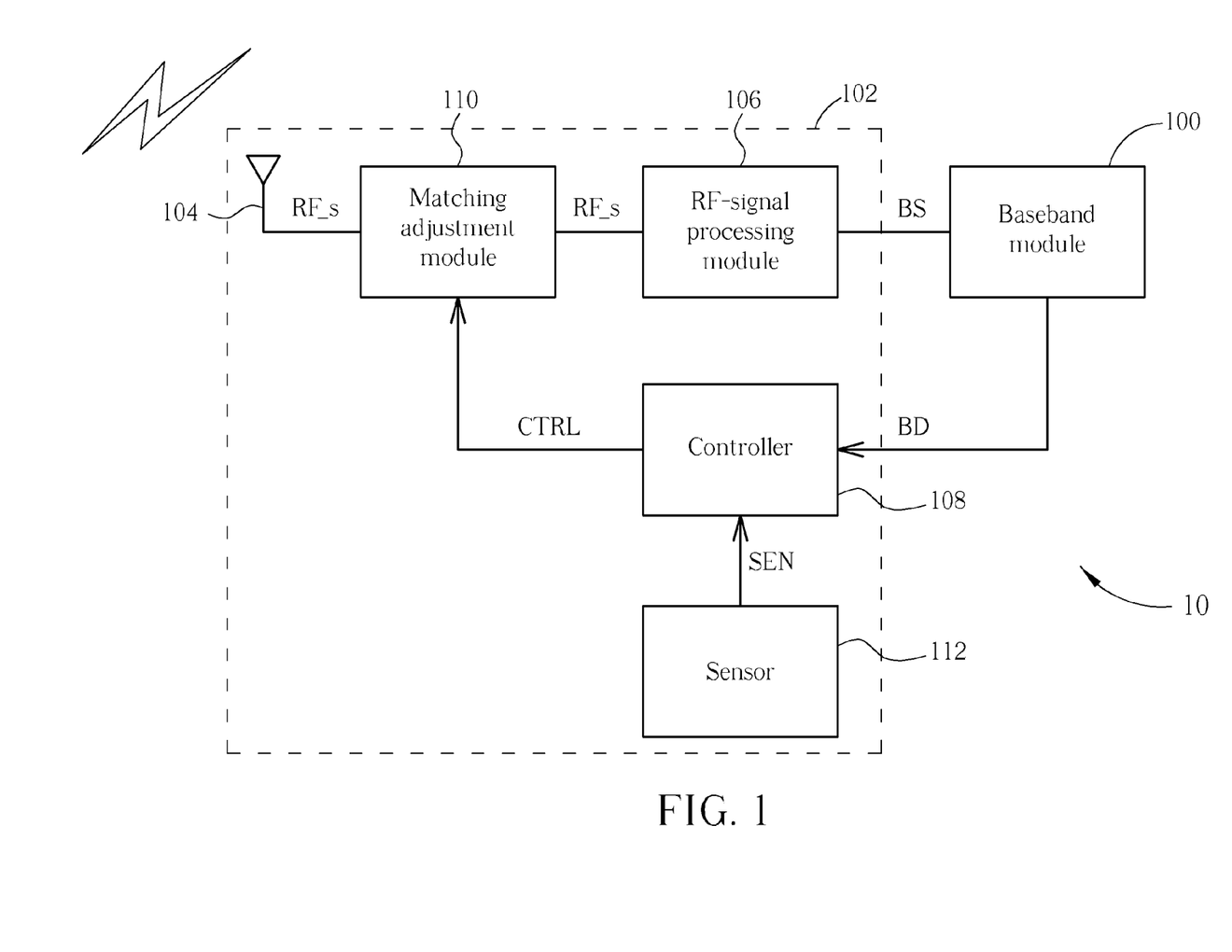
FIG. 1 is a schematic diagram of a wireless communication device in accordance with an embodiment of the present disclosure.

Please refer to FIG. 1, which is a schematic diagram of a wireless communication device 10 in accordance with an embodiment of the present disclosure. The wireless communication device 10 may be a mobile phone, portable computer, or any electronic device with wireless communication functionality or capability. The wireless communication device 10 comprises a baseband module 100 and a radio-frequency (RF) processing device 102. The RF processing device 102 comprises an antenna 104, an RF-signal processing module 106, a controller 108, a matching adjustment module 110 and a sensor 112. When the wireless communication device 10 uses a frequency band to establish communication with mobile system, e.g. base station in a mobile network, for a network service, the baseband module 100 generates a band switching signal BD, which includes frequency band information, for the controller 108 accordingly. The controller 108 may be a microprocessor, a controller with firmware, etc., and is utilized for generating a control signal CTRL for the matching adjustment module 110 according to the band switching signal BD, in order to control the matching adjustment module 110 to adjust the impedance between the antenna 104 and the RF-signal processing module 106. More specifically, the matching adjustment module 110 changes impedance between the antenna 104 and the RF-signal processing module 106 according to the control signal CTRL, so as to efficiently deliver the RF signal RF_s to the RF-signal processing module 106. As a result, the RF-signal processing module 106 can efficiently and accurately perform frequency down conversion, demodulation, etc. on the RF signal RF_s, to output baseband (or midband) signal BS to the baseband module 100.

Therefore, the impedance between the antenna 104 and the RF-signal processing module 106 corresponds to the used frequency band. As a result, different impedances generated by the matching adjustment module 110 correspond to different frequency bands delivered to the RF-signal processing module 106.

In addition, the sensor 112 is utilized for sensing a surrounding status of the wireless communication device 10, e.g. whether an object is approaching or whether a user holds the wireless communication device 10, and generates a sensing result SEN for the controller 108, such that the controller 108 can further control the matching adjustment module 110 to adjust the impedance between the antenna 104 and the RF-signal processing module 106.

Note that, FIG. 1 is utilized for illustrating the concept of the present disclosure, and those skilled in the art can readily make modifications or alternations. For example, the sensor 112 may be any kind of sensing units or elements, e.g. proximity sensor and capacitive sensor, depending on system requirements. The matching adjustment module 110 may include electronic elements, such as inductors, capacitors, varactors, etc., as long as it can change the electrical parameters, e.g., impedance, between the antenna 104 and the RF-signal processing module 106 according to the control signal CTRL provided by the controller 108.

Figure 2A:
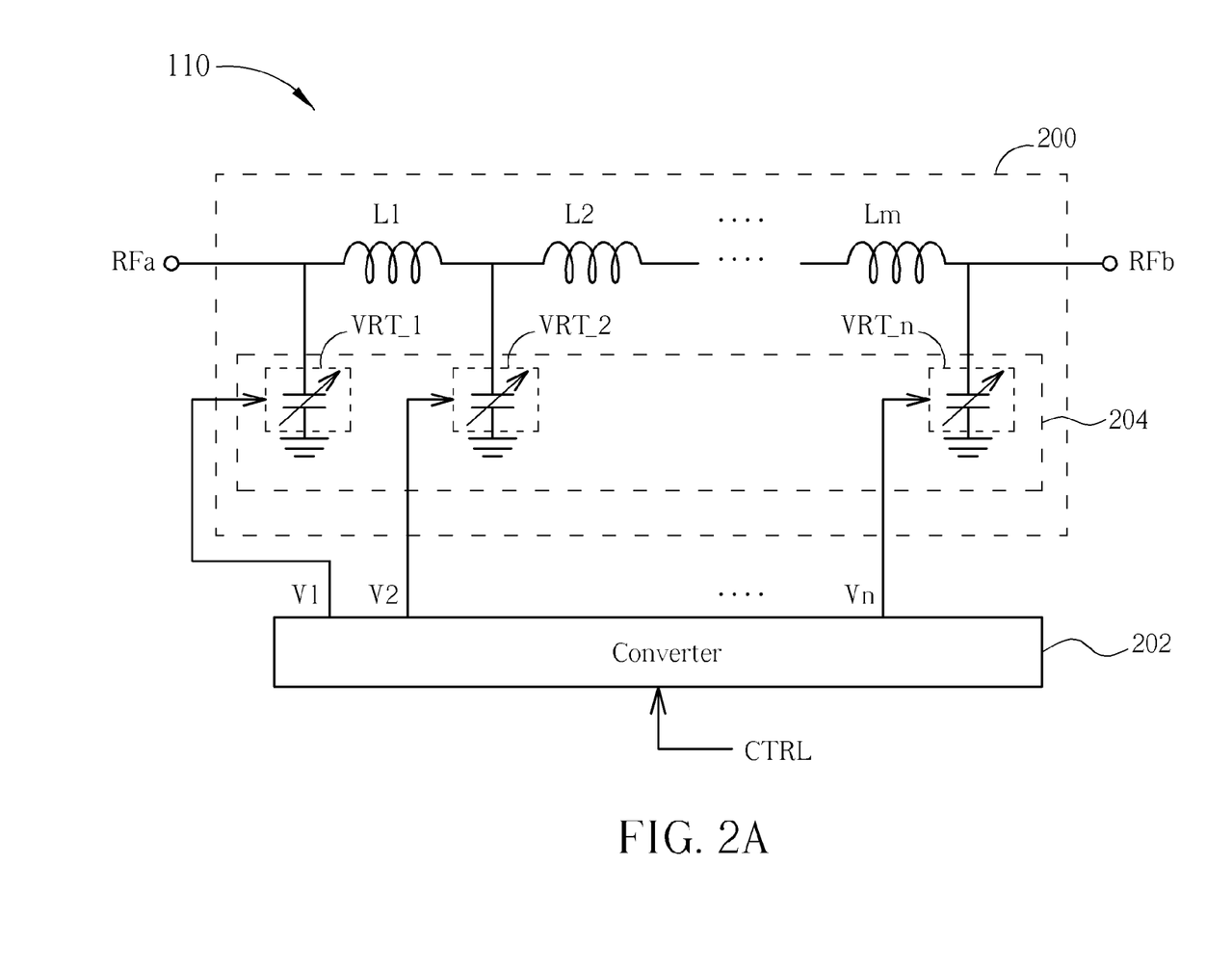
FIG. 2A is a schematic diagram of a matching adjustment module shown in FIG. 1 in accordance with an embodiment of the present disclosure.

For example, please refer to FIG. 2A, which is a schematic diagram of the matching adjustment module 110 in accordance with an embodiment of the present disclosure. As shown in FIG. 2A, the matching adjustment module 110 comprises a matching adjustment circuit 200 and a converter 202. The matching adjustment circuit 200 comprises inductors L1-Lm and a varactor set 204. The inductors L1-Lm are coupled between the antenna 104 and the RF-signal processing module 106 in series. The converter 202 may be a digital to analog converter (DAC), and is utilized for converting the control signal CTRL into voltage signals V1-Vn. The varactor set 204 is composed of varactors VRT_1-VRT_n between the inductors L1-Lm and the ground, and each of the varactors VRT_1-VRT_n has a tunable capacitance in response to an input voltage, i.e. one of the voltage signals V1-Vn. Thus, the varactor set 204 can change the impedance between the antenna 104 and the RF-signal processing module 106 according to the voltage signals V1-Vn.

Figure 2B:
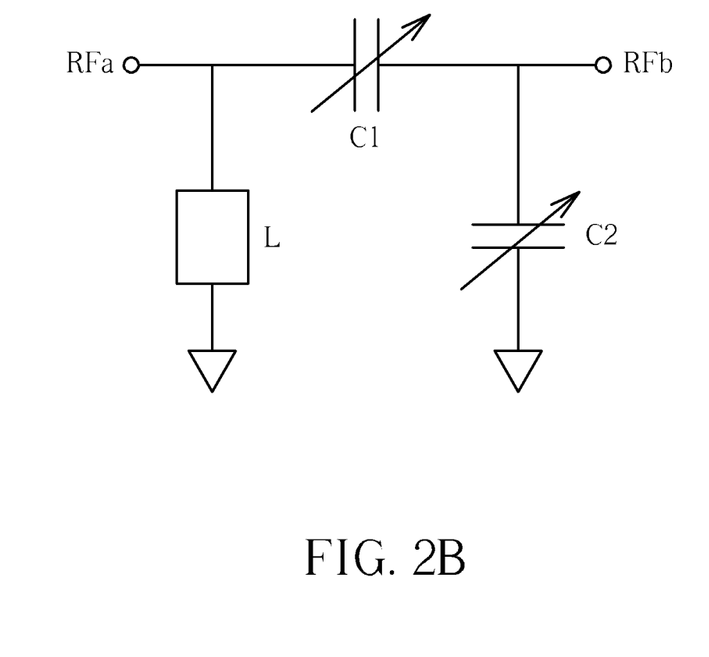
FIG. 2B is a schematic diagram of an equivalent circuit of the matching adjustment module shown in FIG. 2A.
Figure 2C:
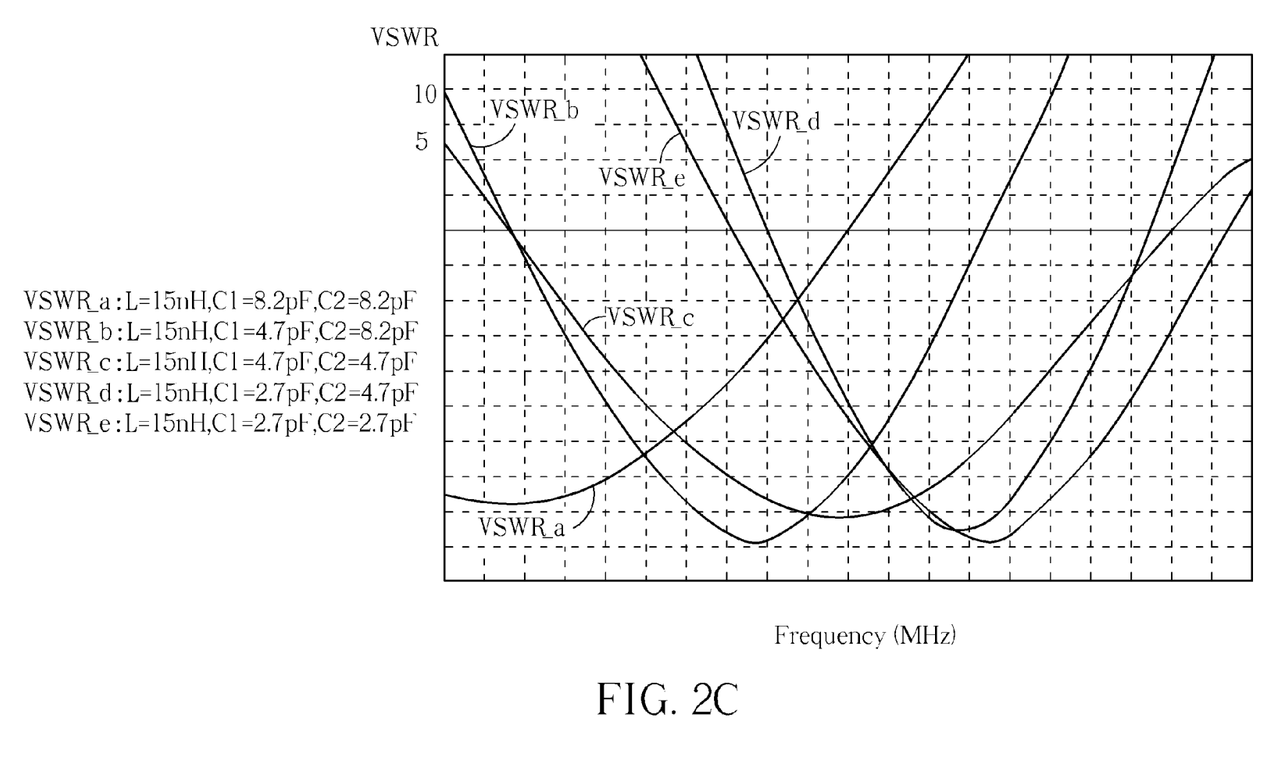
FIG. 2C is a schematic diagram of VSWR in accordance with an embodiment of the present disclosure.

Note that, FIG. 2A is an exemplary embodiment of the matching adjustment module 110, and is to implement an equivalent circuit composed of an equivalent inductor L and equivalent variable capacitors C1 and C2, as shown in FIG. 2B. The voltage signals V1-Vn shown in FIG. 2A are used to adjust capacitance of the equivalent variable capacitors C1 and C2, to change the impedance between the antenna 104 and the RF-signal processing module 106. Thus, with the control of the controller 108, the matching adjustment module 110 can reach different voltage standing wave ratios (VSWRs), i.e. shifting the operating frequency band of the antenna 104. For example, FIG. 2C shows a schematic diagram of VSWR of the antenna 104 in accordance with an embodiment of the present disclosure. As can be seen from FIG. 2C, by adjusting the voltage signals V1-Vn to obtain different capacitance of the equivalent variable capacitors C1 and C2, five different VSWR curves VSWR_a, VSWR_b, VSWR_c, VSWR_d, VSWR_e are obtained.

Figure 2D:
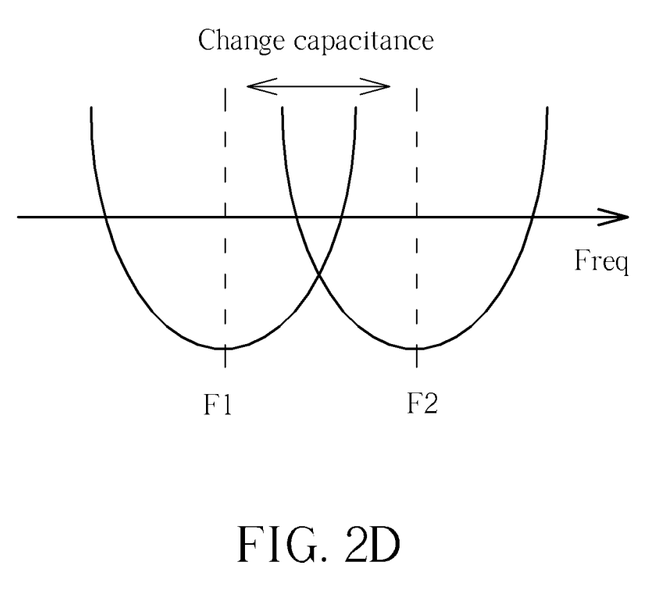
FIG. 2D is a schematic diagram of VSWR in accordance with an embodiment of the present disclosure.

FIG. 2C is an example showing the VSWR of the antenna 104 may be varied in five modes under different voltage signals V1-Vn. However, the VSWR of the antenna 104 is not limit in the five VSWR modes. In fact, with the control of the controller 108, the VSWR of the antenna 104 may be continuously changed between frequencies F1 and F2, as shown in FIG. 2D.

On the other hand, the controller 108 shown in FIG. 1 is utilized for controlling the matching adjustment module 110 to adjust the impedance between the antenna 104 and the RF-signal processing module 106. Note that, the control method of the controller 108 is not restricted in any rule or regulation. For example, as to the matching adjustment module 110 shown in FIG. 2A, the controller 108 may store a plurality of settings in a look-up table, and each setting may comprise band information mapping to a configuration of the voltage signals V1-Vn and be used for determining the electrical parameters (e.g. capacitance) of the matching adjustment circuit 200. Thus, after receiving the band switching signal BD from the baseband module 100 and/or the sensing result SEN from the sensor 112, the controller 108 selects a setting from the look-up table according to the frequency band information of the band switching signal BD, so as to control the matching adjustment module 110.

In the prior art, a common method to broaden operating bandwidth of a mobile antenna, especially to expand the lower bands, is increasing the current flow route, meaning extension of the antenna. Oppositely, the present disclosure utilizes the matching adjustment module 110 and the controller 108 to obtain different impedances between the antenna 104 and the RF-signal processing module 106, so as to vary the VSWR and extend the operating bandwidth of the antenna 104 without extending the antenna 104. In such a situation, a 3G antenna can further support BC13 (764 MHz to 787 MHz) and BC17 (704 MHz to 746 MHz) with the matching adjustment module 110 and the controller 108, and may be reused in a 4G (LTE) system, so as to decrease manufacturing cost and time to market.

Figure 3:
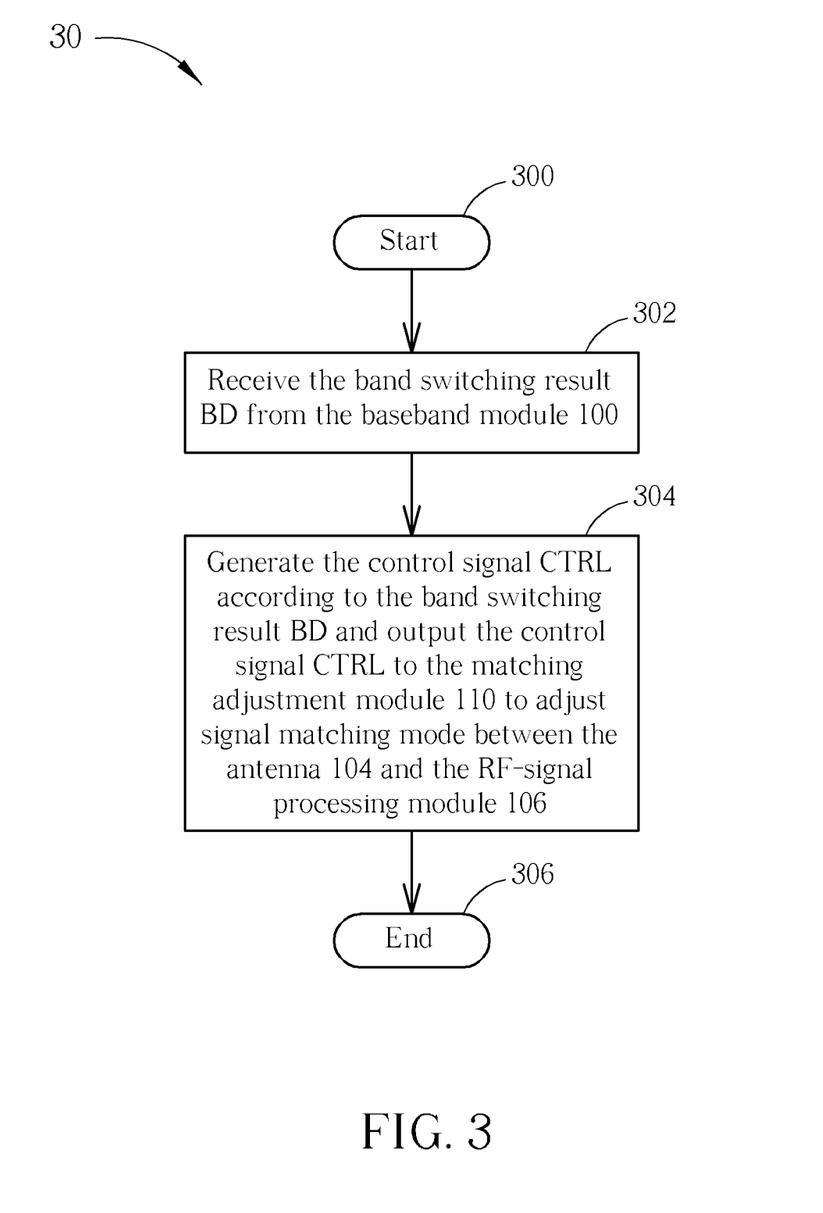
FIG. 3 is a schematic diagram of a process in accordance with an embodiment of the present disclosure.

The operating principle of the controller 108 can further be summarized in a process 30 as shown in FIG. 3. The process 30 comprises the following steps:

Step 300: Start.

Step 302: Receive the band switching signal BD from the baseband module 100.

Step 304: Generate the control signal CTRL according to the band switching signal BD and output the control signal CTRL to the matching adjustment module 110 to adjust impedance between the antenna 104 and the RF-signal processing module 106.

Step 306: End.

Detailed description of the process 30 as well as related modifications or alternations can be referred in the above.

Figure 4:
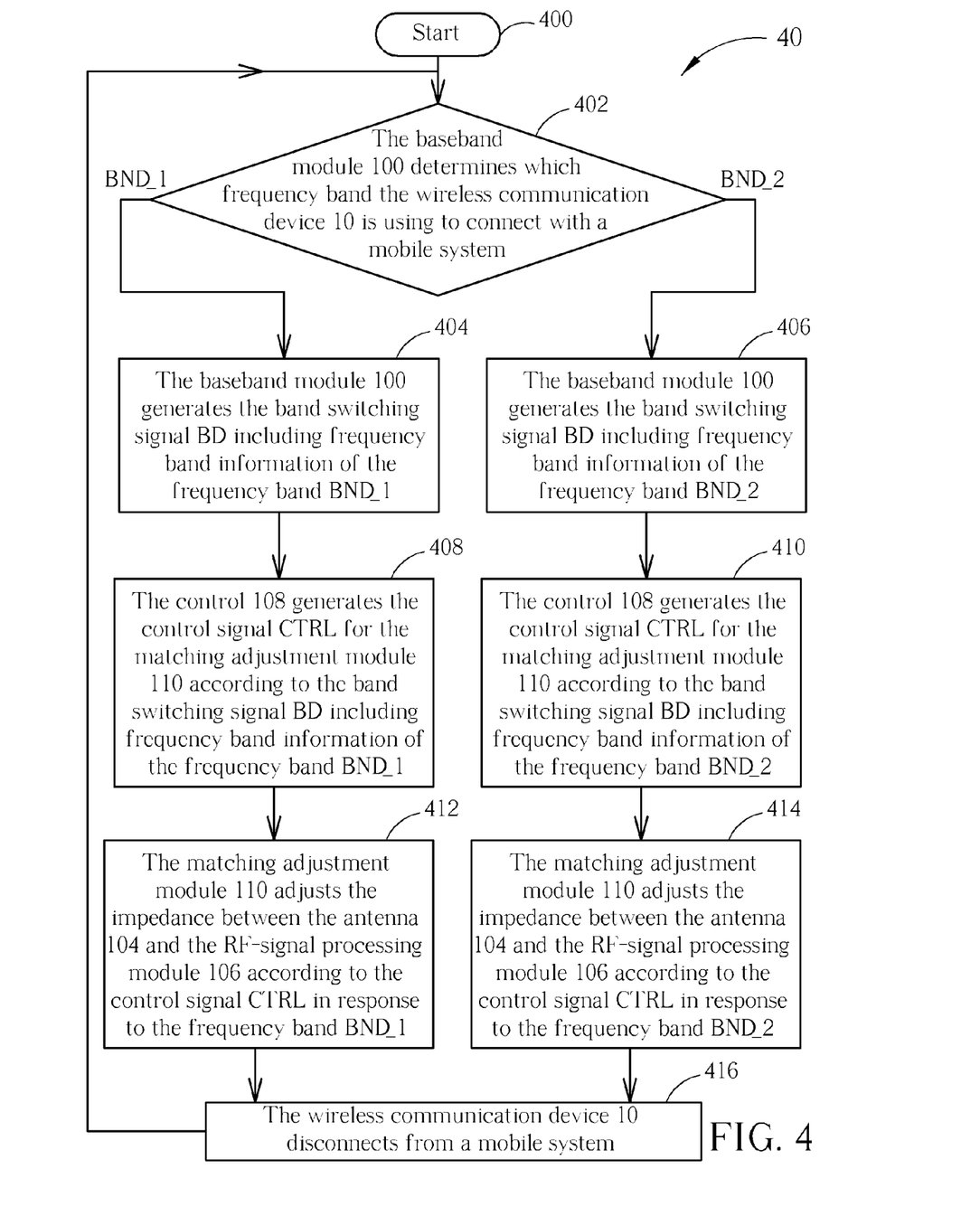
FIG. 4 is a schematic diagram of a process in accordance with an embodiment of the present disclosure.

In addition, as aforementioned, the matching adjustment module 110 can obtain different impedances between the antenna 104 and the RF-signal processing module 106 according to the control signal CTRL generated by the controller 108. Thus, the operating bandwidth of the antenna 104 can be extended, and as a result, the wireless communication device 10 can support multiple frequency bands. For example, please refer to FIG. 4, which illustrates a schematic of a process 40 for the wireless communication device 10 to operate between frequency bands BND_1 and BND_2 in accordance with an embodiment of the present disclosure. The process 40 comprises the following steps:

Step 400: Start.

Step 402: The baseband module 100 determines which frequency band the wireless communication device 10 is using to connect with a mobile system. If the wireless communication device 10 uses the frequency band BND_1, proceed to step 404; if the wireless communication device 10 uses the frequency band BND_2, proceed to step 406.

Step 404: The baseband module 100 generates the band switching signal BD including frequency band information of the frequency band BND_1.

Step 406: The baseband module 100 generates the band switching signal BD including frequency band information of the frequency band BND_2.

Step 408: The control 108 generates the control signal CTRL for the matching adjustment module 110 according to the band switching signal BD including frequency band information of the frequency band BND_1.

Step 410: The control 108 generates the control signal CTRL for the matching adjustment module 110 according to the band switching signal BD including frequency band information of the frequency band BND_2.

Step 412: The matching adjustment module 110 adjusts the impedance between the antenna 104 and the RF-signal processing module 106 according to the control signal CTRL in response to the frequency band BND_1.

Step 414: The matching adjustment module 110 adjusts the impedance between the antenna 104 and the RF-signal processing module 106 according to the control signal CTRL in response to the frequency band BND_2.

Step 416: The wireless communication device 10 disconnects from a mobile system, and then performs step 402.

The process 40 is an example illustrating how to switch the frequency band between BND_1 and BND_2. However, the number of the frequency bands is not limited to 2, and each of the frequency bands BND_1 and BND_2 may further include multiple sub-bands. In one preferred embodiment, BND_1 may be a frequency between 764 MHz and 787 MHz for LTE system or a frequency band between 704 MHz and 746 MHz for LTE system, and BND_2 may be a frequency band between 824 MHz and 894 MHz for 3G system or a frequency band between 880 MHz and 960 MHz for 3G system.

In summary, the present disclosure can obtain different matching states, vary VSWR and extend the operating bandwidth to lower bands without extending the dimension of the antenna.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A radio-frequency (RF) processing device, for a wireless communication device having a baseband module for generating a band switching signal according to a frequency band used by the wireless communication device, comprising:
   an antenna;
   an RF-signal processing module configured to be connected to the baseband module for outputting a baseband or mid-band signal to the baseband module;
   a controller configured to be connected to the baseband module, for generating a control signal according to the band switching signal generated by the baseband module; and
   a matching adjustment module connected to the controller for receiving the control signal from the controller and adjusting an impedance between the antenna and the RF-signal processing module according to the control signal;
   wherein the matching adjustment module comprises:
      a converter, for converting the control signal provided by the controller into a plurality of voltage signals; and
      a matching adjustment circuit comprising a plurality of inductors, coupled between the antenna and the RF-signal processing module in series and a plurality of varactors, coupled between the plurality of inductors and a ground, for changing capacitance between the antenna and the RF-signal processing module according to the plurality of voltage signals to vary voltage standing wave ratios and extend an operating bandwidth of the antenna without extending the antenna.

2. The RF processing device of claim 1, wherein the controller stores a plurality of settings for determining the capacitance, and selects a setting from the plurality of settings as the control signal according to the band switching signal.

3. The RF processing device of claim 1, further comprising a sensor, for sensing a surrounding status of the wireless communication device, wherein the controller further generates the control signal according to the surrounding status.

4. A radio-frequency (RF) processing method, for a wireless communication device having an antenna, an RF-signal processing module, a baseband module, a matching adjustment module and a controller coupled between the baseband module and the matching adjustment module, comprising:
   sensing whether an object is approaching the wireless communication device and generating a sensing result;
   generating, with the baseband module, a band switching signal according to a frequency band used by the wireless communication device;
   generating, with the controller, a control signal according to the band switching signal and the sensing result; and
   adjusting, with the matching adjustment module, an impedance between the antenna and the RF-signal processing module according to the control signal to vary voltage standing wave ratios and extend an operating bandwidth of the antenna without extending the antenna.

5. The RF processing method of claim 4, wherein the step of adjusting, with the matching adjustment module, the impedance between the antenna and the RF-signal processing module according to the control signal is adjusting a plurality of electrical parameters between the antenna and the RF-signal processing module according to the control signal.

6. The RF processing method of claim 5, further comprising storing a plurality of settings for determining the plurality of electrical parameters, and selecting a setting from the plurality of settings for adjusting the plurality of electrical parameters according to the control signal.

7. The RF processing method of claim 5, wherein the plurality of electrical parameters comprise capacitance.

8. A wireless communication device, comprising:
   a baseband module configured to generate a band switching signal according to a frequency band used by the wireless communication device; and
   a radio-frequency (RF) processing device, comprising:
      an antenna;
      an RF-signal processing module connected to the baseband module for outputting a baseband or mid-band signal to the baseband module;
      a controller connected to the baseband module, for generating a control signal according to the band switching signal generated by the baseband module; and
      a matching adjustment module connected to the controller for adjusting an impedance between the antenna and the RF-signal processing module according to the control signal;
      wherein the matching adjustment module comprises:
         a converter, for converting the control signal provided by the controller into the plurality of voltage signals; and
         a matching adjustment circuit comprising a plurality of inductors, coupled between the antenna and the RF-signal processing module in series and a plurality of varactors, coupled between the plurality of inductors and a ground, for changing capacitance between the antenna and the RF-signal processing module according to the plurality of voltage signals to vary voltage standing wave ratios and extend an operating bandwidth of the antenna without extending the antenna.

9. The wireless communication device of claim 8, wherein the controller stores a plurality of settings for determining the capacitance, and selects a setting from the plurality of settings as the control signal according to the band switching signal.

10. The wireless communication device of claim 8, further comprising a sensor, for sensing a surrounding status of the wireless communication device, wherein the controller further generates the control signal according to the surrounding status.

11. The wireless communication device of claim 8, wherein the baseband module generates the band switching signal according to a frequency band used by the wireless communication device.

12. The wireless communication device of claim 10, wherein the sensor is a proximity sensor, which is configured to sense whether an object is approaching the wireless communication device and generate a sensing result, according to which the controller generates the control signal.

13. A wireless communication device, comprising:
a baseband module, configured to generate a band switching signal;
a proximity sensor, configured to sense whether an object is approaching the wireless communication device and generate a sensing result;
a radio-frequency (RF) processing device, comprising:
  an antenna;
  an RF-signal processing module connected to the baseband module for outputting a baseband or mid-band signal to the baseband module;
  a controller connected to the baseband module, for generating a control signal according to the band switching signal generated by the baseband module and the sensing result generated by the proximity sensor; and
a matching adjustment module connected to the controller for receiving the control signal from the controller and adjusting an impedance between the antenna and the RF-signal processing module according to the control signal to vary voltage standing wave ratios and extend an operating bandwidth of the antenna without extending the antenna.

* * * * *